Oct. 15, 1957 C. H. RANDOLPH 2,809,589
ELECTRO-MAGNETICALLY OPERATED PUMP
Filed March 11, 1955 3 Sheets-Sheet 1

INVENTOR.
CHALMERS H. RANDOLPH
BY
William C. Babcock
ATTORNEY.

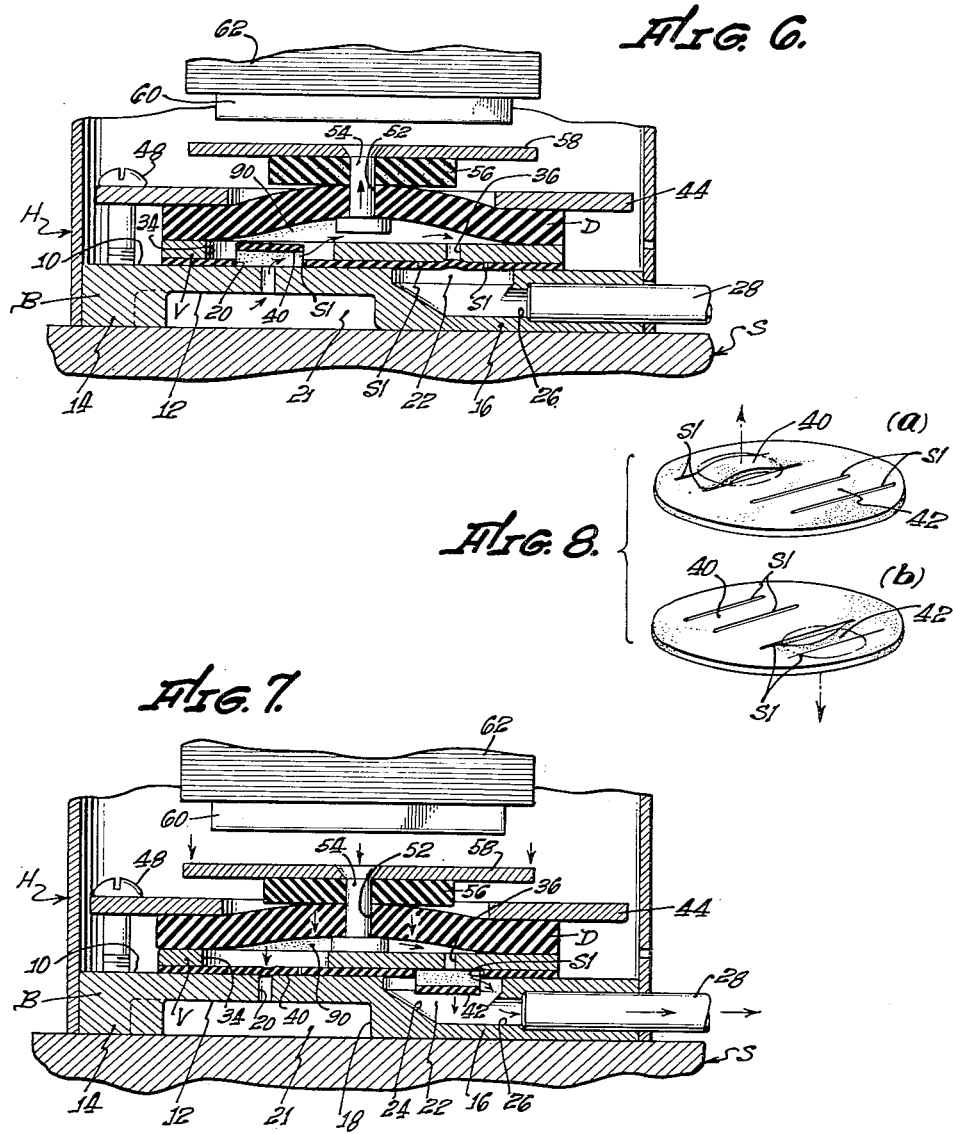

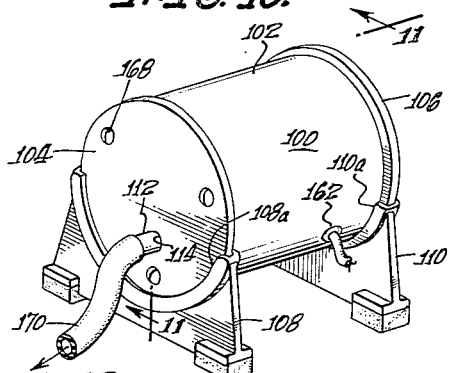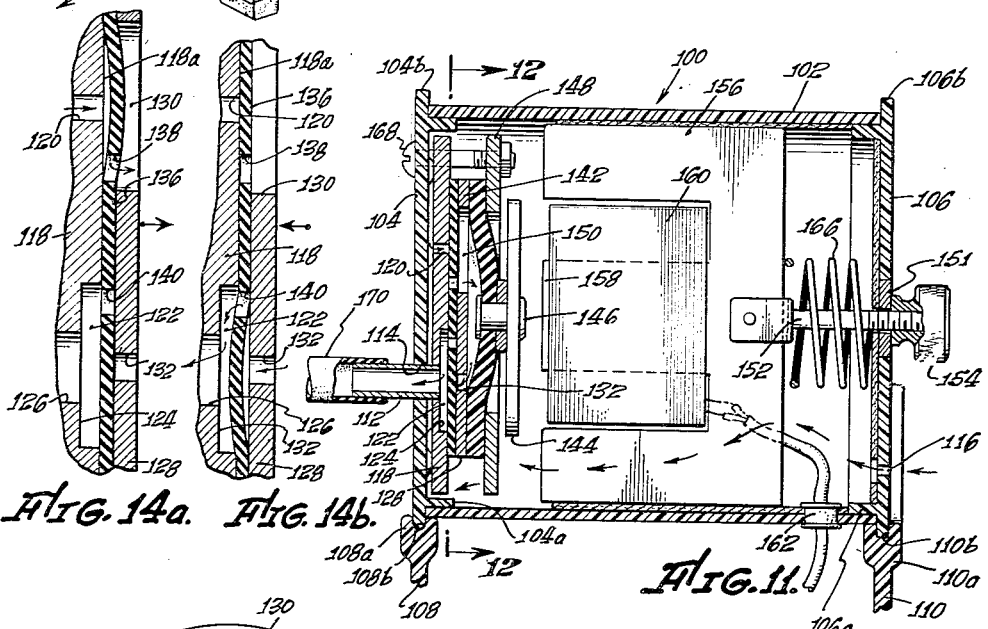

United States Patent Office 2,809,589
Patented Oct. 15, 1957

2,809,589

ELECTRO-MAGNETICALLY OPERATED PUMP

Chalmers H. Randolph, Long Beach, Calif.

Application March 11, 1955, Serial No. 493,709

11 Claims. (Cl. 103—53)

The present invention relates generally to the field of pumps, and more particularly to an improved electro-magnetically operated pump particularly adapted for aerating purposes or in the production of a vacuum.

A major disadvantage in many prior electro-magnetically operated pumps resides in the use of a resilient diaphragm which is stretched over a cavity and reciprocated to achieve a pumping action. Due to the constant strain that the diaphragm is at all times subjected to, as well as additional stresses to which the diaphragm is subjected as it reciprocates, the diaphragm in most instances has a relatively short life. In addition, the rapid reciprocation of the stressed diaphragm generates an audible hum, which in many instances is sufficiently objectionable to preclude the use of this type of pump where it would otherwise be practical and satisfactory. Attempts have been made in the past to minimize or eliminate this humming noise of stressed diaphragm pumps by wadding, packing and other muffling means but with relatively little success.

A further objectionable feature inherent to previously available electro-magnetically operated pumps embodying the use of reciprocating diaphragms is the necessity of using cement to bond the component parts thereof together in the desired water or air-tight assembly.

A major object of the present invention is to provide a pump in which the disadvantages of previously available diaphragm type pumps are substantially eliminated in that the diaphragm embodied in the present invention is stretched only when the device is operating, the component parts thereof are so disposed in functional sequence as to provide a fluid tight seal without the use of cement, and the electro-magnetic unit is so disposed that any unit vibration is not transmitted to the pump housing.

Another object in devising the present invention is to supply a pump in which the component parts are so arranged that the outer housing therefor may be styled in any shape or size, and permits the pump to be used for such diverse purposes as aeration of aquariums, for hospital use in the removal of fluid from incisions during operations, draining the bladder, draining saliva from the mouth, or the like.

Yet another object of the invention is to provide a pump in which the rubber components are not stressed during assembly, the rubber components serve as fluid seals in the assembly of the invention, and with all the components generated on a circle for ease in assembling the invention.

These and other objects and advantages of the present invention will become apparent from the following description of two forms thereof, and from the drawings illustrating those forms of the invention, in which:

Figure 6 is a vertical cross-sectional view of the pump showing the intake port open and the exhaust port closed;

Figure 7 is a vertical cross-sectional view of the pump showing the intake port closed and the exhaust port open;

Figure 8 is a perspective view of the resilient diaphragm, showing the intake and exhaust ports in both the open and closed positions;

Figure 9 is a side elevational view of an alternate device which may be employed to impart an actuating motion to the pump;

Figure 10 is a perspective view of a second form of the invention;

Figure 11 is a vertical cross-sectional view of the second form of the invention taken on the line 11—11 thereof in Figure 10;

Figure 12 is a vertical cross-sectional view of the device taken on line 12—12 of Figure 11;

Figures 13a and 13b are perspective views of the resilient deformable valve member showing portions of said member that deform as fluid is drawn into said pump to be discharged therefrom;

Figure 14a is an enlarged fragmentary vertical cross-sectional view of the device showing the position of the valve member as fluid is drawn into the pump;

Figure 14b is the same view as shown in Figure 14a, but showing the valve member after it has assumed the position it occupies when fluid is being discharged from the pump.

Figure 1:
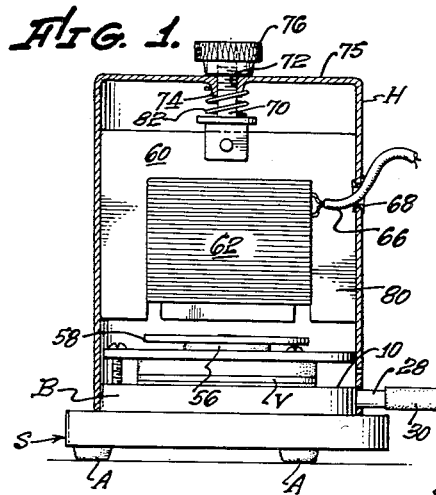
Figure 1 is a combined side elevational and vertical cross-sectional view of the pump.

Referring to the drawings for the general arrangement of the first form of the invention, it will be seen to include an inverted cup-shaped housing H which slidably engages and is removably affixed to the side walls of a base plate B. The base plate B is mounted on the upper surface of a support S of desired design that has resilient pads A affixed to the under side thereof.

Plate B is circular and has a flat upper surface 10 and a lower recessed surface 12 that is defined by a circumferentially extending flange 14 from which a neck 16 extends inwardly to terminate in an annular portion 18. A fluid inlet opening 20 leads downwardly from surface 10 to a cavity 21 defined by surface 12 and flange 14. An annular fluid outlet opening 22 considerably larger in cross-sectional area than that of opening 20 is formed in surface 10 above portion 18, which opening defines a large body shoulder 24 at its junction with a bore 26 which serves as a continuation thereof. Bore 26 leads downwardly from body shoulder 24 and then outwardly through neck 16 and flange 14. The outer portion of bore 26 is adapted to so receive a fluid discharge tube 28 that a portion thereof will project from base plate B on which a resilient tube 30 may be mounted.

Figure 2:
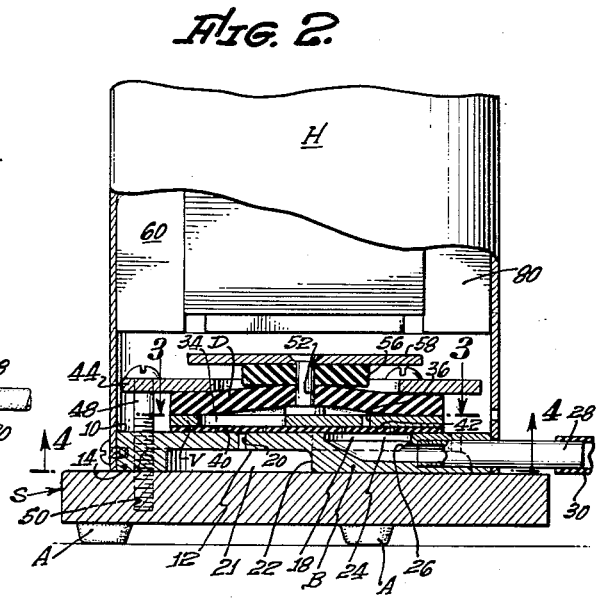
Figure 2 is a fragmentary vertical cross-sectional view of the lower portion of the pump.
Figure 3:
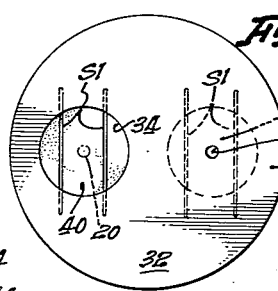
Figure 3 is a horizontal cross-sectional view of the pump taken on line 3—3 of Figure 2.
Figure 5:
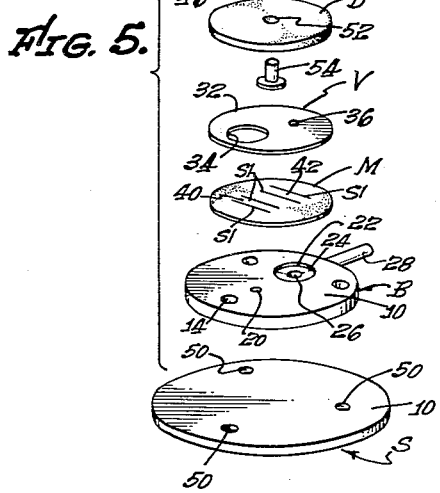
Figure 5 is an exploded perspective view of the pump components disposed in spaced relationship for sequential assembly into a pumping unit.
Figure 4:
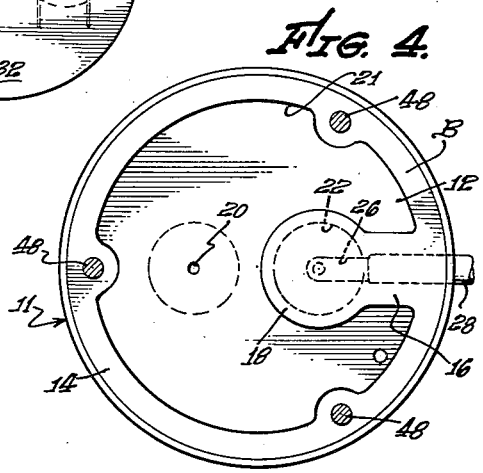
Figure 4 is a horizontal cross-sectional view of the pump taken on the line 4—4 of Figure 2.

The circular valve plate V utilized in the pump is shown in Figures 2, 5, 6, and 7, which is fabricated from a rigid material 32 of appreciable thickness and has a relatively large circular fluid inlet passage 34 formed therein, as well as a fluid outlet passage 36 of considerably smaller cross-sectional area than the inlet passage. The two passages 34 and 36 are so spaced on plate V as to be centered relative to inlet 20 and outlet 22 when the plate is disposed in a predetermined position above the base plate B.

A resilient valve member M is provided which is of substantially the same diameter as valve plate V, and which is preferably formed of sheet material such as gum rubber. Four parallel slits S1 are formed in member M that are so disposed as to define two elongate, substantially rectangular strips 40 and 42. Valve member M is adapted to occupy a sandwiched position between the upper surface of base plate B and the lower surface of valve plate V. When valve member M is so disposed in a non-distorted position, the strip 40 seals one end of the fluid inlet in base B opening 20, with the strip 42 sealing one end of the fluid discharge passage 36 in valve plate V.

An annular resilient diaphragm D (Figure 5) overlies valve plate V, with the diaphragm being held in place thereon by a flat retainer ring 44, also shown. Three circumferentially spaced bores 46 are formed in ring 44, and screws 48 are provided that extend downwardly through bores 46 to engage tapped bores 50 formed in support S. When screws 48 are tightened, the retainer ring 44 is caused to exert sufficient pressure on the circumferential portions of the diaphragm D, valve V, valve member M and base B that fluid-tight seals are effected therebetween without recourse to the use of glue or other bonding agents.

A central bore 52 is formed in diaphragm D through which a screw, rivet, or other fastening means 54 extends to rigidly hold a circular resilient pad 56 on the upper diaphragm surface. A ferrous armature 58 rests on the upper surface of the pad 56, and is rigidly affixed thereto by fastening means 54.

An iron core 60 of E-shaped cross section is positioned within the confines of housing H, the legs of which core are invertically disposed. An electrical conducting wire coil 62 is mounted on the central leg of core 60. An extension 66 is provided on the wire of coil 62 that passes outwardly through a ferrule 68 disposed in the side wall of housing H, and a plug (not shown) is affixed to the extremity of extension 66 by means of which it may be connected to a source of domestic alternating electrical current.

A threaded rod 70 is rigidly affixed to the upper portion of core 60, which rod projects upwardly therefrom through a vertical bore 72 formed in a boss 74 that is an integral part of the top 75 of housing H. A knurled nut 76 rotatably engages rod 70 on the exterior surface of the housing top 75, which nut when rotated varies the distance between the armature and the electromagnet so effected by the combination of core 60 and coil 62. A helical spring 82 positioned within housing H encircles rod 70. One end of spring 82 abuts against the lower face of boss 74, and the other end of the spring against a portion of core 60. Spring 82 is at all times under compression, and tends to prevent transfer of any vibration or reciprocal movement of the electromagnet 80 to housing H. Inasmuch as the pump portion of the invention is mounted on support S and the electromagnet 80 is suspended from the housing H, the possibility that the device will create an audible humming when in operation is substantially eliminated.

Lowering of the air pressure in confined space 90 will throw the air pressure in this space and the fluid discharge opening 22 out of equilibrium, whereby air immediately tends to flow from opening 22 through the fluid discharge port 36 in valve member M into space 90. However, due to the high ratio between the cross-sectional area of opening 22 and port 36, but a minute lessening of air pressure in space 90 will cause valve 42 to seal the lower entry to fluid discharge port 36. Thus, on the intake cycle of the pump operation, air is drawn into the confined space 90, but little or no air can escape therefrom, as outlined above.

After the diaphragm D has completed its upward movement in one cycle of operation of the invention, the resiliency of the material forming the diaphragm draws the diaphragm downwardly toward the valve member M, and air pressure is then increased in space 90 due to the contraction in the volume of the space. Valve 40 is then forced downwardly to seal the inner end of fluid inlet opening 20, and valve 42 is moved away from a sealing position with fluid discharge port 36 to permit air to flow from confined space 90 to fluid discharge opening 22 in which the air is at a lower pressure than that in the confined space. The above-described pumping operation is completed each time diaphragm D is moved upwardly as a result of the energization of the electromagnet 80.

A modification of the first form of the invention is shown in Figure 9, wherein the armature 58 has an eye 59 mounted thereon that movably engages a pin or journal 61 affixed to one end of a lever 63. Lever 63 is pivotally supported by a shaft 65, and reciprocatory motion is imparted to the end portion thereof opposite that end on which pin 61 is supported, by a conventional prime mover (not shown), such as an electric motor, or the like. The operation of this alternate form is exactly the same as the first form, except for the manner in which armature 58 is reciprocated. The armature 58 embodied in this alternate form need not, of course, be fabricated from a ferrous material.

A second form of the invention is shown in Figures 10 to 14b, inclusive. The component parts comprising this second form are completely enclosed in a housing 100 which embodies a cylindrical shell or tube 102 preferably fabricated from a phenolic resin or other lightweight, non-electrical conducting material. Two circular end pieces 104 and 106 are also provided that have circumferentially extending flanges 104a and 106a respectively formed on the inner faces thereof. The flanges are of such external diameter as to permit slidable insertion thereof within the end portions of shell 102. When so mounted on the shell the peripheral lips 104b and 106b respectively of end pieces 104 and 106 extend outwardly beyond the exterior surface of shell 102.

Supports 108 and 110, identical in structure, are provided for the forward and rearward end pieces of the housing and serve to maintain the shell 102 at elevated horizontal position shown in Figures 10 and 11. The flat horizontal lower edge portions of supports 108 and 110 can be ornamented as desired, and have upwardly and inwardly tapering side edges, concave arcuate upper edge portions 108a and 110a in which vertical slots 108b and 110b respectively are formed. In Figure 11 it will be seen that the lower portions of lips 104b and 106b are slidably inserted into the confines of slots 108b and 110b respectively. The engaged lower portions of lips 104b and 106b are bonded to supports 108 and 110 by conventional means, and shell 102 is similarly bonded to flanges 104a and 106a.

A fluid discharge tube 112 (Figures 10 and 11) extends outwardly through a bore 114 formed in end piece 104. An aperture 116 is formed in end piece 106 through which aperture fluid, normally air, is admitted into the confines of housing 100. A rigid annular member or plate 118 is provided having an inlet port 120 and an outlet port 122 formed therein. Port 122 is considerably larger than port 120 on the inwardly disposed face 118a of the member, and forms a relatively large body shoulder 124 at its junction with a bore 126 in which the inner end of fluid discharge tube 112 is disposed.

A rigid annular valve plate 128 is provided that is smaller in diameter than the rigid member 118. A relatively large first annular fluid passage 130 is formed in plate 128, as well as a second fluid passage 132 which is of considerably less cross-sectional area than that of passage 130. Passages 130 and 132 are so spaced on plate 128 as to permit centering thereof relative to the inlet port 120 and outlet port 122, as can best be seen in Figures 11, 12, 14a and 14b.

A resilient valve member 136 in the form of an annular sheet of a resilient material such as gum rubber is also provided that has two openings 138 and 140 formed therein through which fluid can flow. Member 136 is of the same diameter as valve plate 128, and as shown in Figure 11, member 136 is sandwiched between the adjacent faces of rigid member 118 and plate 128. Openings 138 and 140 are so spaced in valve member 136 as to be near the adjacent portions of fluid passage 130 and outlet port 122.

An annular resilient diaphragm 142 overlies valve plate 128, which diaphragm has a ferrous armature 144 mounted on that side thereof facing the rear end piece 106 with the armature preferably being secured on the diaphragm by means of a rivet 146 extending therethrough. A retainer ring 148 abuts against the peripheral portion of diaphragm 142 and presses this peripheral portion, as well as peripheral portions of valve plate 128, valve member 136, and rigid member 118 together to form a circumferentially extending fluid-tight wall defining a part of a confined space 150.

A centrally positioned boss 151 is mounted on or formed in end piece 106, in which boss a tapped bore is formed that is rotatably engaged by a threaded rod 152. A knurled cylindrical handle 154 is provided on the outer end of rod 152, and the other end of the rod supports a magnetizable core 156 preferably of an E-shaped cross section. The center leg 158 of core 156 has a coil of electrical conducting wire 160 mounted thereon which provides electrical actuating means for the reciprocation of armature 144 and diaphragm 142 when alternating electrical current is supplied to the coil. Such electrical current is so supplied to coil 160 by an insulated electrical conductor extending into the confines of housing 100 through a bore formed in the lower rear portion thereof, in which bore a ferrule 162 is seated. A helical spring 166 is disposed within the confines of housing 100 and extends between the outer face 156a of the core and the interior face of end piece 106. Spring 166 is at all times under compression, and tends to prevent vibration of core 156, as well as maintain the core in spaced relationship with end piece 106. As may be seen in Figure 11, the pump assembly is mounted on end piece 104 by means of screws or other fastening means 168 that engage it and the retaining ring 148.

The operation of this second form of the invention is extremely simple. A tube 170 is connected to fluid discharge tube 118 and extended to that location where it is desired to utilize air under pressure. In theory this form operates in the same manner as previously described in connection with the first form of the invention. However, the diaphragm 136 of the second form has a distinct advantage in that as the valves are integrally formed therewith, they tend to remain in the same plane as the balance of the diaphragm and are in kinetic balance. These factors assure a positive opening and closing of the valves, even at high operating frequencies.

Although the forms of the invention herein shown and described are fully capable of achieving the objects and providing the advantages hereinabove mentioned, it is to be understood that they are merely illustrative of the presently preferred embodiments of the invention, and that there is no intention of limiting same to the details of construction as shown and described, other than as defined in the appended claims.

The invention claimed is:

1. A device for use in creating a differential in fluid pressure, including: a rigid member in which a fluid inlet passage and a fluid outlet passage are formed; a single valve member contacting a single side of said rigid member, with said valve member sealing said inlet and outlet passages when it is in a non-deformed position, which valve member has a first deformable portion and a second deformable portion, the first of which defines a first fluid passage means in communication with said inlet upon deformation, with said second portion defining a second fluid passage means in communication with said outlet upon deformation; a valve plate of appreciable thickness overlying said valve member, said plate having a first opening into which said first portion can deform, and a second opening through which fluid can flow to deform said second portion into said outlet passage; a normally non-deformed diaphragm overlying said valve plate; means that clamp the edge portions of said rigid member, valve member, valve plate and diaphragm into fluid-tight engagement to define a confined space; and electrically operated means to reciprocate said diaphragm, which diaphragm as it is moved away from said rigid member by said electrically operated means lessens the fluid pressure in said confined space sufficiently below the pressure on the exterior of said rigid member that said first valve portion deforms into said first opening to permit fluid to flow through said inlet into said confined space, and as said diaphragm is returned toward said member it increases the fluid pressure in said space sufficiently to return said first portion to its non-deformed position and deforms said second valve portion into said outlet passage permitting fluid under pressure in said space to flow therefrom through said outlet passage.

2. A device as defined in claim 1 in which said first and second deformable portions are first and second areas of said valve member that are partially separated from the balance of said valve member by a plurality of slits formed therein.

3. A device as defined in claim 1 in which said first and second deformable portions are first and second rectangular areas of said valve member that are partially separated from the balance of said valve member by a plurality of parallel slits formed therein.

4. A device as defined in claim 1 in which said first and second deformable portions are first and second areas of said valve member having openings formed therein through which fluid can flow when said portions are deformed.

5. A device as defined in claim 1 in which said first and second deformable portions are first and second circular areas of said valve member having non-centered openings formed therein through which fluid can flow when said portions are deformed.

6. A device as defined in claim 2 in which said fluid outlet passage in said rigid member is of greater cross-sectional area than that of said fluid inlet passage.

7. A device as defined in claim 2 in which said valve plate is formed with a first opening having a greater cross-sectional area than said second opening.

8. A device as defined in claim 2 in which said fluid outlet passage is of greater cross-sectional area than that of said fluid inlet passage and said valve plate is formed with a first opening that is of greater cross-sectional area than that of said second opening.

9. A device for use in creating a differential in fluid pressure, including: a rigid member in which a fluid inlet passage and a fluid outlet passage are formed; a single valve member contacting a single side of said rigid member, with said valve member sealing said inlet and outlet passages when it is in a non-deformed position, which valve member has a first deformable portion and a second deformable portion, the first of which defines a first fluid passage means in communication with said inlet upon deformation, with said second portion defining a second fluid passage means in communication with said outlet upon deformation; a valve plate of appreciable thickness overlying said valve member, said plate having a first opening into which said first portion can deform, and a second opening through which fluid can flow to deform said second portion into said outlet passage; a normally non-deformed diaphragm overlying said valve plate; means that clamp the edge portions of said rigid member, valve member, valve plate and diaphragm into fluid-tight engagement to define a confined space; a ferrous armature affixed to said diaphragm; and electromagnetic means actuatable by an alternating current, which means is so located relative to said armature as to cause reciprocal motion of said diaphragm when said electro-magnetic means is actuated.

10. A device as defined in claim 9 in which said electro-magnetic means is a solenoid.

11. A device as defined in claim 9 in which said rigid member, valve member, valve plate, diaphragm, clamping means and electro-magnetic means are completely enclosed in a housing, and manually adjustable means are provided that are operable from outside said housing to vary the distance between said electro-magnetic means and armature, which electro-magnetic means as it is advanced toward said armature increases the amplitude of said diaphragm reciprocal movement with a consequent volume increase in said confined space as said diaphragm is moved away from said valve member.

References Cited in the file of this patent
UNITED STATES PATENTS

| | | |
|---|---|---|
| 1,986,831 | Le Valley | Jan. 8, 1935 |
| 2,707,074 | Tussey | Apr. 26, 1955 |